United States Patent [19]
Mount

[15] 3,637,048
[45] Jan. 25, 1972

[54] AUXILIARY LUBRICATING SYSTEM
[72] Inventor: Gordon L. Mount, West Monroe, N.Y.
[73] Assignee: Carrier Corporation, Syracuse, N.Y.
[22] Filed: Sept. 22, 1969
[21] Appl. No.: 859,935

[52] U.S. Cl............................184/6.1, 184/6.4, 184/6.16
[51] Int. Cl...................................................F16n 29/02
[58] Field of Search................................184/6 C, 6 L, 6 D

[56] References Cited

UNITED STATES PATENTS

| | | | |
|---|---|---|---|
| 1,647,135 | 11/1927 | Johnson | 184/6 |
| 2,028,448 | 1/1936 | Harza | 184/6 UX |
| 2,245,175 | 6/1941 | Bany | 184/6 X |
| 2,440,371 | 4/1948 | Holley, Jr. | 184/6 UX |

FOREIGN PATENTS OR APPLICATIONS

| | | | |
|---|---|---|---|
| 1,079,392 | 5/1954 | France | 184/6 D |
| 674,493 | 6/1952 | Great Britain | 184/6 D |

Primary Examiner—Manuel A. Antonakas
Attorney—Harry G. Martin, Jr. and J. Raymond Curtin

[57] ABSTRACT

The lubricating system includes an auxiliary oil pump, powered by an auxiliary power supply for supplying oil under pressure to a machine having a large, heavy rotating part, such as an impeller, which has a coast down period of substantial length upon interruption of the operating power to the machine. The system is so rigged that the auxiliary pump is not powered unless the machine was in operation at the time of the power interruption.

4 Claims, 1 Drawing Figure

PATENTED JAN 25 1972
3,637,048
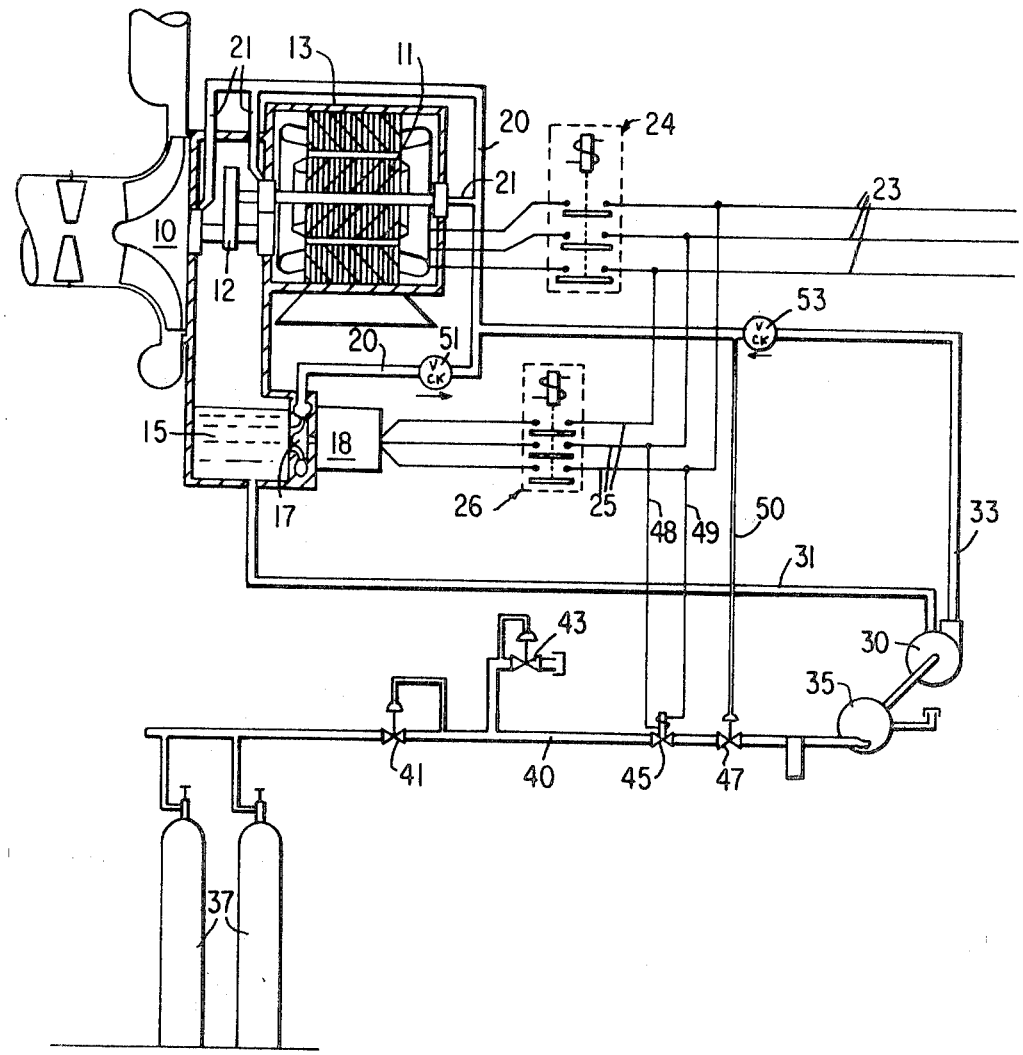
INVENTOR.
GORDON L. MOUNT.
BY D. Emmett Thompson
ATTORNEY.

3,637,048

AUXILIARY LUBRICATING SYSTEM

BACKGROUND OF THE INVENTION

In machines having a large, heavy component rotating at high speeds, the bearings supporting the rotating component are conventionally supplied with oil under pressure. An example of such a machine is a centrifugal compressor used in a high tonnage refrigerating system. Usually, operating power is not supplied to the prime mover effecting rotation of the impeller until after the oil pressure to the bearings has reached a predetermined value. This is to prevent excessive bearing wear during the startup period of the machine. In like manner, the power to the actuating prime mover is discontinued in the event of oil pressure failure.

This invention has as an object a lubricating system for a machine embodying the arrangement referred to, which functions by means of an auxiliary oil pump and an auxiliary power supply to maintain the oil pressure for a period of time following the interruption of power supply to the prime mover driving the machine or to the apparatus for controlling the application of power into the prime mover.

SUMMARY OF THE INVENTION

In addition to the main oil pump associated with the machine, there is provided an auxiliary oil pump which is operated by an auxiliary power supply.

The auxiliary oil pump is actuated upon failure of the operating power supply for the machine or upon interruption of the energy source for controlling the application of power to the machine. In the arrangement disclosed, the main oil pump is powered by an electric motor supplied from the service that furnishes electric power to the driving motor of the machine. The auxiliary oil pump is operated by a gas motor, and a supply of gas under pressure is available for operating the gas motor. Upon failure of the electric service, valving is operated to connect the gas motor to the gas supply, the supply being sufficient to operate the auxiliary oil pump for at least a period of time comparable to the coast down period of the machine. The control valving for the auxiliary pump includes a valve held closed by pressure in the oil line from the main oil pump and which opens when the main oil pump ceases to operate.

With this arrangement, the auxiliary oil pump is not powered unless the machine was in operation at the time of the main power failure or interruption.

BRIEF DESCRIPTION OF THE DRAWING

The drawing is a schematic view illustrating the system of my invention applied to a refrigeration compressor of the centrifugal type.

DESCRIPTION OF THE PREFERRED EMBODIMENT

In the drawing, 10 designates the impeller of a centrifugal gas compressor. The impeller 10 is rotated at high speed by an electric motor 11 through gearing 12. The motor and gearing are mounted in a casing 13 formed with an oil supply sump or reservoir 15.

An oil pump 17 illustrated as a centrifugal pump is driven by an electric motor 18. The pump 17 has a discharge line 20 connected to branch lines 21 for conducting oil to the bearing structures of the machine.

The motor 11 is powered from a supply line 23 through a motor starter 24. The pump motor 18 is powered by a branch circuit 25 through motor starter 26. The branch circuit 25 is connected to the main electric service supply 23.

In machines of this type, an arrangement is conventionally used which functions to prevent closing of the contacts of the motor starter 24 until the oil pressure in line 20 has reached a predetermined value to assure lubrication for the machine bearings at the time of the startup.

In the event of interruption of the service line 23, there will be interruption of power to the oil pump motor 18 and it will stop quickly. However, due to the momentum accumulated in the impeller 10 and the rotor of motor 11, these parts will continue to rotate for a period of time. During this coast down period, the bearings are supplied with oil by an auxiliary oil pump 30.

The auxiliary oil pump 30 has a suction or intake line 31 extending to the oil reservoir 15 and a discharge line 33 connected to the discharge line 20 from the main oil pump 17.

The auxiliary pump 30 is powered by a gas-operated motor 35, powered by gas in pressurized tanks 37. The tanks 37 are operatively connected to the motor 35 through line 40. A reducing valve 41 serves to reduce the gas pressure in line 40 to a proper value for operating the motor 35. It will be understood that the tanks 37 are highly pressurized gas cylinders. A relief valve 43 is provided to prevent overpressurization of the line 40 downstream from the regulating valve 41. The flow of gas through line 40 to the motor 35 is controlled by valves 45, 57. Valve 45 is a normally open solenoid-operated valve. The coil of the valve is connected by wires 48, 49 to the circuit 25, which in turn is connected to the service 23.

The valve 47 is a normally closed pressure-operated valve. Its actuating mechanism is connected by conduit 50 to the oil discharge line 33. A check valve 51 is arranged in the oil line 20 intermediate the pump 18 and the connection of line 33 to line 20. A check valve 53 is arranged in the line 33 between the auxiliary pump 30 and the control conduit 50. With this arrangement, the main oil pump 17 operates to provide pressure to valve 47 through conduit 50 to hold the valve in open position, allowing the flow of gas through line 40 to the motor 35 of auxiliary pump 30 in the event solenoid valve 45 is deenergized. It will be apparent that if pump 17 is in operation supplying pressure on valve 47 to maintain it in open position and the electric service line 23 is interrupted, solenoid valve 45 will immediately open. Upon stoppage of pump motor 18, valve 47 will not immediately close because the pressure through conduit 50 will be maintained by check valves 51, 53. Accordingly, the auxiliary pump 30 will be immediately powered, applying pressure through line 33 to line 20. Accordingly, oil pressure will be supplied to the bearings of the machine. The tanks or cylinders 37 contain a gas supply sufficient to power the pump 30 for a period exceeding the coast down period of the compressor.

The normally closed valve 47 serves to prevent the flow of gas to motor 35 unless the machine was in operation just prior to the interruption or failure of the power service 23. That is, if there is a failure or interruption in service 23 while the machine is shut down, the valve 47 will be closed because of the lack of immediate pressure in the lines 20, 33. Accordingly, this arrangement prevents unnecessary operation of the auxiliary oil pump 30 if power failure occurs while the machine is not in operation. Preferably, the valve 47 is of the type which, if while the valve is open by pressure in control line 50, the main gas flow is applied to the valve as by opening valve 45, the valve 47 will remain open as long as any pressure exists on line 40 regardless of a pressure drop in the output from the auxiliary pump 30 and in control line 50.

The impeller 10 or like component of a machine may be rotated by a prime mover other than an electric motor, for example, by a steam turbine. In such an arrangement, the steam supply valve for the turbine is regulated and controlled by an electric service circuit, which also supplies power to the motor operating the main oil pump. In a system involving such an arrangement, failure of the electric control circuit will result in a shutdown of the machine. However, lubrication during the coast down period will be provided by the system of my invention, as will be apparent.

What is claimed is:

1. In a system supplying lubricating oil under pressure to an operating machine having a rotor, said system including a main oil pump having a discharge oil line supplying oil under pressure of predetermined value for lubrication of said machine, a common electrical energy source, operable when energized to supply operating power separably to said machine and said main oil pump, an auxiliary oil pump, an auxiliary power supply, control means operable during pressurization of said oil line by said main oil pump to said predetermined value and upon simultaneous deenergization of said common electrical energy source to connect said auxiliary pump to said auxiliary power supply.

2. A lubricating system as set forth in claim 1 wherein said auxiliary pump is powered by a gas motor connected to a pressurized gas supply through valve mechanism operated in part by pressurization of said oil line by said main oil pump to said predetermined pressure, and in part by deenergization of said common electrical energy source.

3. A lubrication system as set forth in claim 1 wherein said auxiliary pump is powered by a gas-operated motor connected to a pressurized gas supply by first and second valves connected in series, said first valve being a normally opened solenoid-operated valve held closed by energization of said electrical source and said second valve is a normally closed pressure-operated valve held open by pressurization of said oil supply line.

4. In a system for supplying lubricating oil to a machine, said system including an oil supply reservoir, a main oil pump, an electric motor operatively connected to said pump for driving the same, an electric line for supplying energy to said motor, an oil line extending from the discharge side of said pump to said machine for lubricating the same, an auxiliary pump having discharge side thereof connected to said oil line, a gas-operated motor for operating said auxiliary pump, the intake sides of said pumps being connected to said supply reservoir, a supply of gas under pressure, a gas line connecting said supply to said gas motor, said line including a normally opened solenoid-operated valve and a normally closed pressure-operated valve, said valves being connected in series in said gas line, said pressure-operated valve being connected to said oil line and held in open position by pressure in said line, the coil of said solenoid-operated valve being connected to said oil line and held in open position by pressure in said line, the coil of said solenoid-operated valve being connected to the said electric line and upon energization thereby, said valve is maintained in closed position, whereby upon interruption of power in said electric line during pressurization of said oil line, said gas motor is supplied with gas from said gas supply.

* * * * *